United States Patent [19]

Oskouy et al.

[11] Patent Number: 5,675,829
[45] Date of Patent: Oct. 7, 1997

[54] METHOD AND APPARATUS FOR COORDINATING DATA TRANSFER BETWEEN HARDWARE AND SOFTWARE BY COMPARING ENTRY NUMBER OF DATA TO BE TRANSFERRED DATA TO ENTRY NUMBER OF TRANSFERRED DATA

[75] Inventors: Rasoul M. Oskouy, Fremont; Denton E. Gentry, Palo Alto, both of Calif.

[73] Assignee: Sun Microsystems, Inc., Mountain View, Calif.

[21] Appl. No.: 499,317

[22] Filed: Jul. 7, 1995

[51] Int. Cl.$^6$ .......................... G06F 13/00; G06F 13/12; G06F 9/46

[52] U.S. Cl. ............... 395/826; 395/849; 395/200.2; 395/878

[58] Field of Search ........................... 395/825, 826, 395/200.2, 849, 853, 854, 855, 877, 878; 370/390, 395

[56] References Cited

U.S. PATENT DOCUMENTS

| | | | |
|---|---|---|---|
| 4,285,038 | 8/1981 | Suzuki | 395/877 |
| 4,458,316 | 7/1984 | Fry et al. | 395/250 |
| 4,462,074 | 7/1984 | Linde | 395/588 |
| 4,888,691 | 12/1989 | George et al. | 395/182.13 |
| 5,097,442 | 3/1992 | Ward et al. | 365/78 |
| 5,249,271 | 9/1993 | Hopkinson et al. | 395/377 |
| 5,265,228 | 11/1993 | Beaudoin et al. | 395/306 |
| 5,299,313 | 3/1994 | Petersen et al. | 395/200.2 |
| 5,430,846 | 7/1995 | Moore | 395/250 |
| 5,488,724 | 1/1996 | Firoozmand | 395/200.07 |
| 5,507,032 | 4/1996 | Kimura | 395/826 |
| 5,548,587 | 8/1996 | Bailey et al. | 370/395 |
| 5,555,380 | 9/1996 | Suzuki | 395/250 |
| 5,572,522 | 11/1996 | Calamvokis et al. | 370/390 |
| 5,592,684 | 1/1997 | Gaskins El Al. | 395/872 |

FOREIGN PATENT DOCUMENTS

0 459 752 A2   5/1991   European Pat. Off.

*Primary Examiner*—Thomas C. Lee
*Assistant Examiner*—D. Dinh
*Attorney, Agent, or Firm*—Blakely Sokoloff Taylor & Zafman

[57] ABSTRACT

A method and apparatus of coordinating data transfer between hardware and software in a computer system through the use of a semaphore mechanism is disclosed. When a data packet is queued by preparing an entry in a data descriptor ring, software provides the descriptor entry number to a first storage field in a predetermined storage location which is accessible by hardware. Hardware accounts for the transactions it has completed by writing the descriptor entry number to a second storage field in the storage location. To determine if there is additional data to process, hardware compares the contents of the first storage field and the contents of the second storage field. If the contents of both storage fields are equal, the corresponding ring or channel has run out of data and no additional data is to be processed. Under this condition, the corresponding channel goes to sleep until it is waken by a command indicating that software has provided another descriptor entry number to the first storage field in the storage location. If the contents of both storage fields are not equal, hardware continues to process the data represented by the descriptors provided.

20 Claims, 5 Drawing Sheets

METHOD AND APPARATUS FOR COORDINATING DATA TRANSFER BETWEEN HARDWARE AND SOFTWARE BY COMPARING ENTRY NUMBER OF DATA TO BE TRANSFERRED DATA TO ENTRY NUMBER OF TRANSFERRED DATA

BACKGROUND OF THE INVENTION

1. Field of the Invention

The present invention relates generally to the field of computer systems and, in particular, to a method and apparatus for coordinating data transfer between hardware and software in computer systems.

2. Description of the Related Art

Properly functioning computer systems generally provide a mechanism which guarantees an orderly access to shared memory and other shared resources. This is necessary to protect data from being changed simultaneously by two or more processors. A binary variable called a semaphore is often used to denote ownership and to indicate the processor which owns the shared resource for writing. A semaphore is a software-controlled flag that is stored in a memory location that is typically used between two processors.

By convention, when the semaphore is equal to 0, it means that a particular processor owns the shared resource for writing to, so that the shared memory is not available for other processors to write to. When the semaphore is equal to 1, the ownership of the shared memory is relinquished to any requesting processor. The processors sharing the same memory segment do not need a semaphore handshake to indicate ownership when they are reading from the shared memory segment. Instead, a semaphore handshake is only needed if the processors intend to write to the shared memory segment. Once a processor acquires ownership of a shared memory segment, it does its processing and updates the shared memory segment, after which, it relinquishes its ownership by toggling the semaphore bit (from 0 to 1 or 1 to 0).

In transferring data within a computer system, coordination between hardware and software is traditionally accomplished through the use of a semaphore mechanism which incorporates the use of OWN bits in descriptor rings to indicate current ownership of each descriptor on the ring. A descriptor ring is a data structure having a plurality of entries (for example, 1 to N) which are arranged in a circular fashion. The content of each entry in the descriptor ring is known as a descriptor. A typical descriptor contains a base address field which provides the base of the page table address in a segmented-page organization or the block base address in a segment register organization. Each descriptor includes a bit which is set to a '1' if the entry is owned by hardware or a '0' if the entry is owned by software. This bit is known as an "OWN" bit. The owner of the descriptor is responsible for releasing ownership when it updates the descriptor. Thus, when software has completed the posting of transmission packets, it sets the OWN bit to a 1 and when hardware has completed transmission of a packet, it clears the OWN bit.

The use of the OWN bit semaphore mechanism imposes significant overhead on each transaction, as the hardware must write back to the descriptor to clear the OWN bit each time it completes a transaction. In a typical transmission system utilizing only one channel, one such descriptor ring is used for the channel. However, in systems which utilize the Asynchronous Transfer Mode (ATM) protocol, such overhead is multiplied because multiple channels are used and typical solutions to the problems posed by transactional overhead are not easily scalable.

In addition, the hardware in these conventional systems has to periodically inquire if software has posted packets for transmission. This is conventionally accomplished by polling memory to determine the status of the OWN bit. These visits to memory may however, be futile because the software may not have posted any entries thereby leaving the OWN bit unset. As a result, the hardware has to continue polling memory until the software posts packets for transmission and signifies the completion of this task by setting the OWN bit. The requirement for polling decreases the bandwidth for the Input/Output system that can otherwise be used by other devices sharing the same system.

Accordingly, there is a need in the technology for a method and apparatus for coordinating data transfer between hardware and software in computer systems through the efficient use of descriptor rings, which eliminates the need for polling memory and the need to clear OWN bits, thereby reducing transactional overhead and processing time.

BRIEF SUMMARY OF THE INVENTION

A method and apparatus of coordinating data transfer between hardware and software in a computer system through the use of a semaphore mechanism is disclosed. When a data packet is queued by preparing an entry in a data descriptor ring, software provides the descriptor entry number to a first storage field in a predetermined storage location which is accessible by hardware. Hardware accounts for the transactions it has completed by writing the descriptor entry number to a second storage field in the storage location. To determine if there is additional data to process, hardware compares the contents of the first storage field and the contents of the second storage field. If the contents of both storage fields are equal, the corresponding ring or channel has run out of data and no additional data is to be processed. Under this condition, the corresponding channel goes to sleep until it is waken by a command indicating that software has provided another descriptor entry number to the first storage field in the storage location. If the contents of both storage fields are not equal, hardware continues to process the data represented by the descriptors provided. The present invention eliminates the need for polling memory to determine if data is to be processed. It also eliminates the need to clear OWN bits, thereby reducing transactional overhead and processing time.

DETAILED DESCRIPTION OF THE INVENTION

Figure 1:
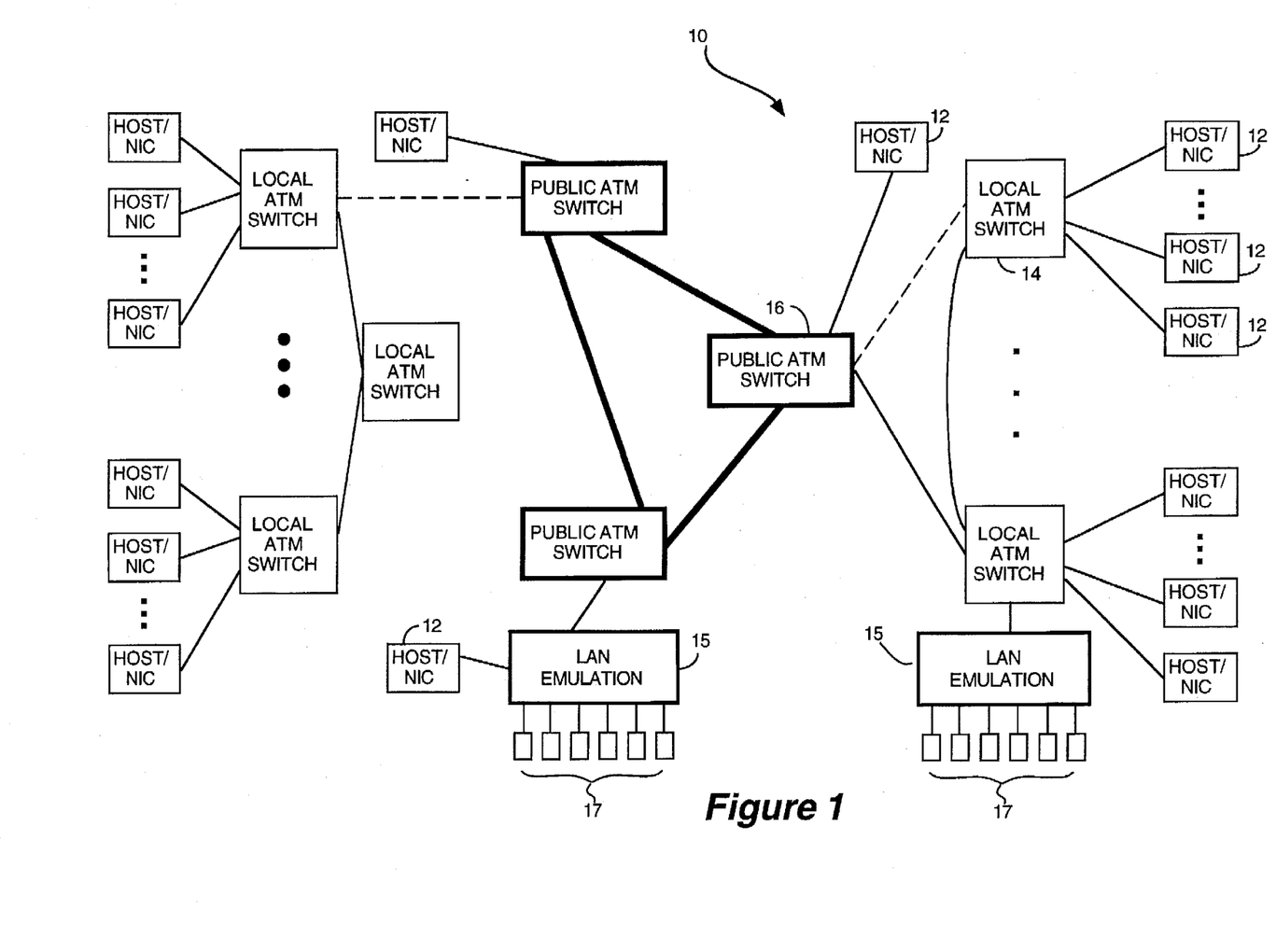
FIG. 1 illustrates an exemplary computer system network incorporating an asynchronous transfer mode network interface circuit which utilizes the method and apparatus of data transfer coordination of the present invention.

FIG. 1 illustrates an exemplary computer system network incorporating the ATM network interface circuit which utilizes the method and apparatus of data transfer coordination of the present invention. The computer system network 10 includes host computer systems (not shown) which incorporate one or more of the ATM network interface circuits (NIC) 12. The NICs 12 are coupled through a local ATM switch 14 to a public ATM switch 16 to enable asynchronous transfer of data between host computer systems coupled to the network 10. Alternately, the NICs 12 can be coupled directly to the public ATM switch 16. As shown in FIG. 1, the computer system network 10 may also include computer systems which incorporate the use of a Local Area Network ("LAN") emulation 15 which serves as a gateway for connecting other networks such as Ethernet or token ring networks 17 which utilize the ATM network as a supporting framework.

Figure 2:
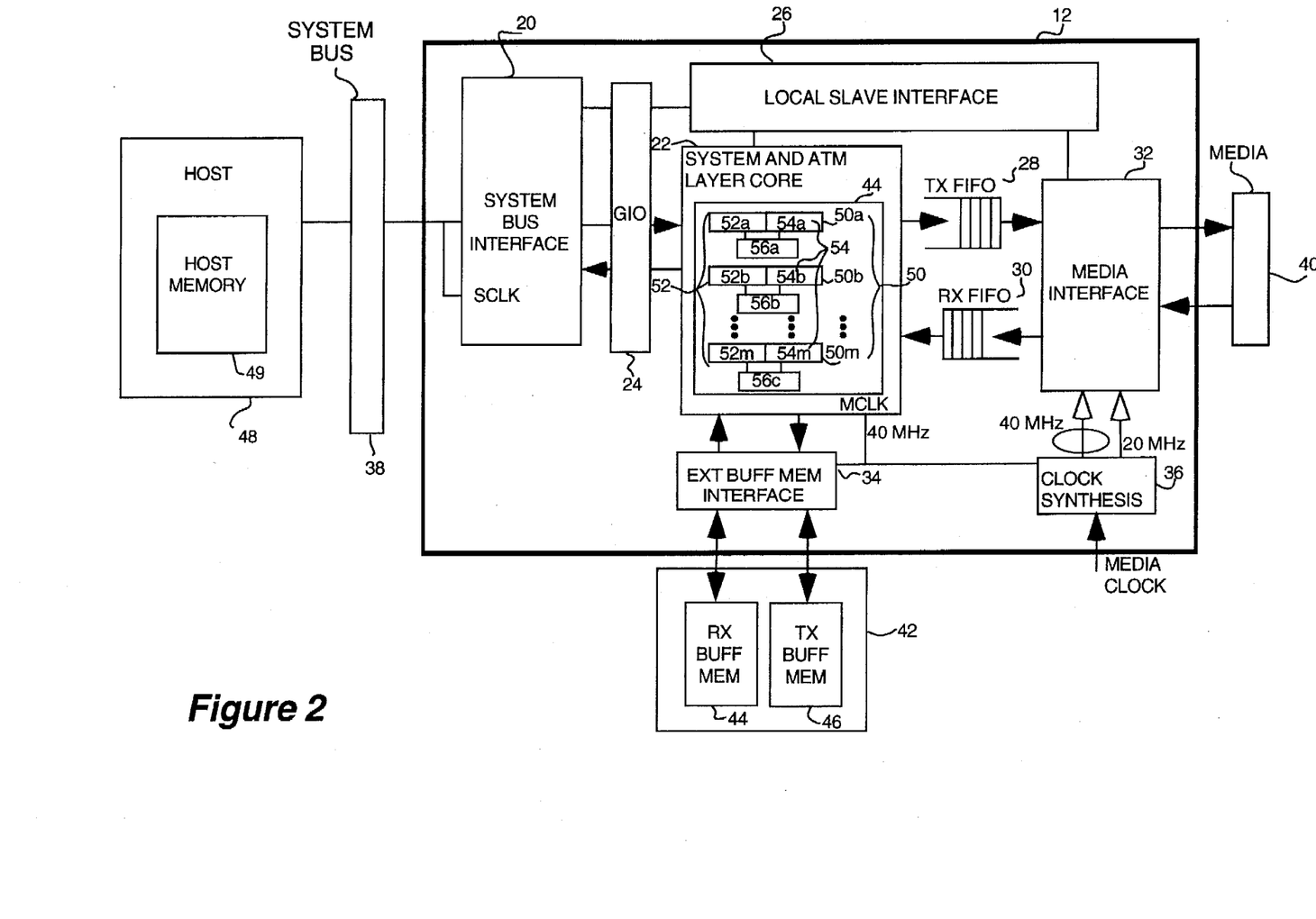
FIG. 2 is an overall system diagram illustrating the architecture of the asynchronous transfer mode network interface circuit which utilizes the method and apparatus of data transfer coordination in accordance with a preferred embodiment of the present invention.

FIG. 2 is a simplified system diagram illustrating the architecture of the ATM NIC 12 which utilizes the method and apparatus of data transfer coordination in accordance with a preferred embodiment of the present invention. The ATM NIC 12 interfaces a host computer system 48 coupled through system bus 38 to the network media 40 operating in accordance with the ATM protocol.

The ATM NIC 12 shown includes a System Bus interface 20, a Generic Input/Output ("GIO") interface 24, a System and ATM Layer Core 22, a Local Slave interface 26, a transmit (TX) FIFO 28, a receive (RX) FIFO 30, a Media interface 32, an External Buffer Memory Interface 34 and a clock synthesis circuit 36.

Together, the elements 20–36 of NIC 12 cooperate to transfer data between the host computer 48 and the other computers in the network through multiple, dynamically allocated channels in multiple bandwidth groups. Collectively, the elements of the network interface circuit 12 function as a multi-channel intelligent direct memory access (DMA) controller coupled to the System Bus 38 of the host computer system 48. In a preferred embodiment, multiple transmit and receive channels are serviced as virtual connections utilizing a full duplex 155/622 Mbps physical link. Multiple packets of data, subscribed to different channels over the System Bus 38 to the external buffer memory 42, via the External Buffer Memory Interface 34, are segmented by the System and ATM Layer Core 22 into transmit cells for transmission to the Media 40 through Media interface 32. The Core 22 also comprises reassembly logic to facilitate reassembly of the received cells to packets.

The Core 22 further includes a storage block 44 which includes a plurality of storage locations 50a–50m, each of which correspond to the number of channels supported by the ATM NIC 12. The storage locations 50a–50m each include a first storage field 52 and a second storage field 54. A comparing circuit 56 is coupled to each storage location 50a–50m, and is used to compare the contents of the first storage field 52 and the contents of the second storage field 54. An example of the comparing circuit 56 is an exclusive-OR gate. In particular, storage location 50a includes a first storage field 52a and a second storage field 54a, while storage location 50m includes a first storage field 52m and a second storage field 54m. The storage location 50a is coupled to comparing circuit 56a, which is used to compare the contents of the first storage field 52a and the contents of the second storage field 54a. Similarly, the storage location 50m is coupled to comparing circuit 56m, which is used to compare the contents of the first storage field 52m and the contents of the second storage field 54m. For discussion purposes, the storage locations 50a–50m, the first storage fields 52a–52m, the second storage fields 54a–54m and the comparing circuits 56a–56m, will be referred in general as the storage location 50, the first storage field 52, the second storage field 54 and the comparing circuit 56. The storage locations 50 and the comparing circuits 56 are used to coordinate data transfer in accordance with the teachings of the present invention, as discussed in detail in the following sections.

The TX and RX FIFOS 28, 30, coupled between the Core 22 and the Media Interface 32, are used to stage the transmit and receive cell payloads of the transmit and receive packets respectively. The Media interface 32 transmits and receives cells to the Media 40 of the network, driven by clock signals provided by Clock Synthesis Circuit 36. Preferably the Media, and therefore the Media interface 32, conforms to the Universal Test and Operations Physical Interface for ATM ("UTOPIA") standard, as described by the ATM Forum Ad Hoc specification. To conform to the UTOPIA specification, the clock synthesis circuit 36 provides either a clock signal of 20 MHz or 40 MHz to enable the Media interface 32 to support a byte stream at 20 MHz for 155 Mbps or a 16 bit stream at 40 MHz for a 622 Mbps data stream.

In the present embodiment, the Media Interface 32 receives 52-byte data cells each having a 4-byte cell header and a 48-byte payload from the TX FIFO 28. The Media Interface 32 inserts a checksum as a fifth byte to the cell header into each cell prior to providing the 53-byte data cell to the Media 40. Conversely, when the Media Interface 32 receives cells from the Media 40, it examines the checksum in the fifth byte of each cell to determine if the checksum is correct. If so, the byte representing the checksum is stripped from the cell and the cell is forwarded to the RX FIFO 30. Otherwise, the entire cell is dropped.

The System Bus interface 20 and GIO interface 24 insulate the host computer system 48 from the specifics of the transfer to the Media 40. Furthermore, the Core 22 is insulated from the specifics of the system bus 38 and host specifics. In the present preferred embodiment, the System Bus is an S-Bus, as specified in the Institute of Electronics and Electrical Engineers ("IEEE") standard 1496 specification. The System Bus Interface 20 is configured to communicate in accordance with the specifications of the system bus, in the present illustration, the S-Bus. It is contemplated that the System Bus Interface 20 can be configured to conform to different host computer system busses. The System Bus Interface 20 is also configured to transfer and receive data in accordance with the protocols specified by the GIO interface 24. The GIO interface 24 provides a singular interface through which the Core 22 communicates with the host computer. Thus, the Core 22 does not change for different embodiments of the NIC 12 which interface to different host computer systems and busses.

Three memory sub-systems are associated with the operation of the NIC 12. These include the host memory 49 located in the host computer system 48, the local buffer memory 42 external to the System and ATM Layer Core 22 and control storage block 44 located in the Core 22. The NIC 12 manages two memory areas: the buffer memory 42 and the storage block 44. The buffer memory 42 contains packet data for all transmit and receive channels supported by the NIC 12. The storage block 44 contains DMA state information for transmit and receive channels and pointers to data structures in host memory 49 for which DMA transfers are performed. The storage block 44 also contains the data structure specifics to manage multiple transmit and receive buffers for packets in transition between the host 48 and the Media 40.

The host computer system 48 includes host memory 49 which contains data packets and pointers to the packets being transmitted and received. As noted previously, the NIC 12 also shields the cell delineation details of asynchronous transfer from the applications running on the host computer system. For present purposes, it is assumed that software running on the host computer system 48 manage transmit and receive data using wrap around transmit and receive rings with packet interfaces as is well known in the art.

Figure 3:
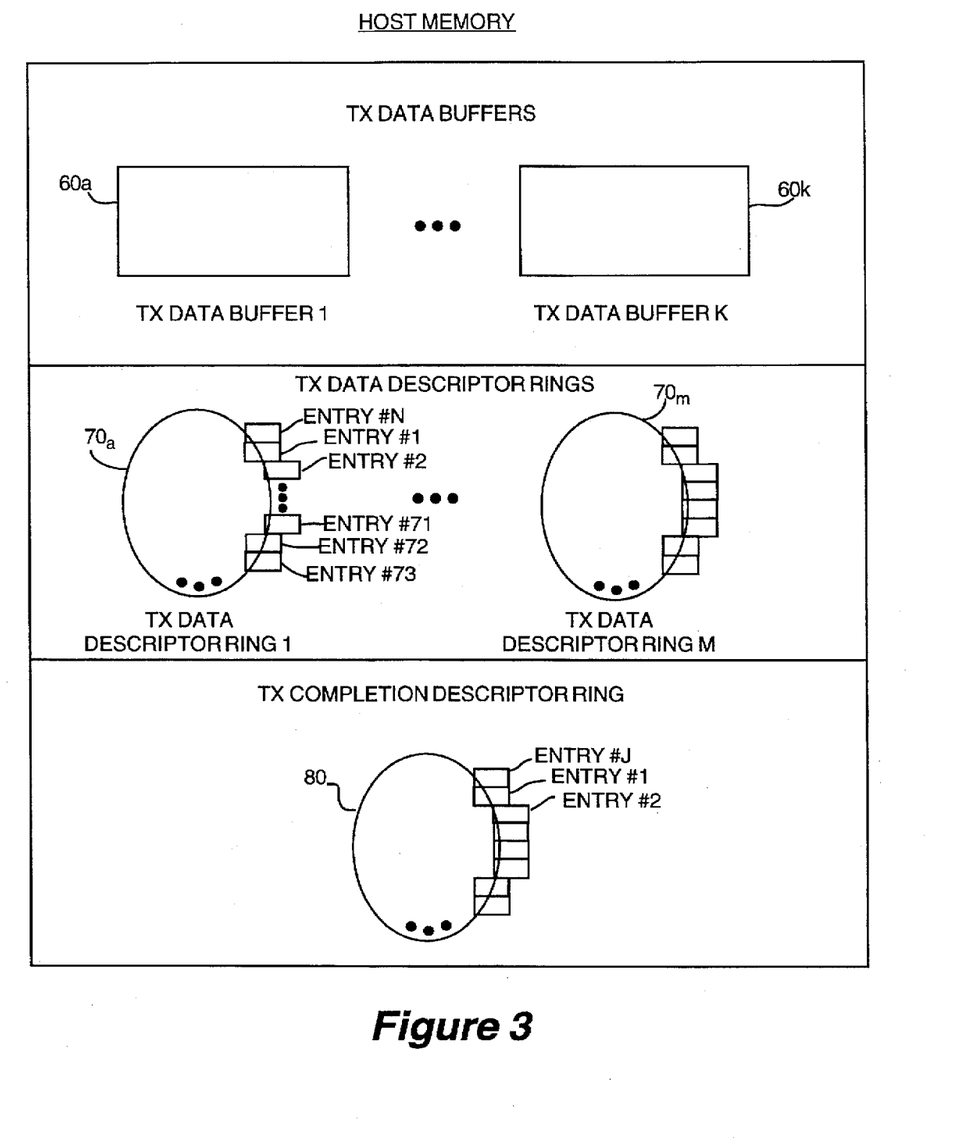
FIG. 3 illustrates a simplified block diagram of a preferred data structure of the host memory used for data of the present invention. transmission in a system utilizing the apparatus and method

FIG. 3 illustrates a simplified block diagram illustrating a preferred data structure of the host memory 49 used for data transmission in a system incorporating the present invention. The host memory includes transmission (TX) data buffers 60a–60k, transmission (TX) data descriptor rings 70a–70m and a transmission (TX) completion descriptor ring 80. The TX data descriptor rings 70a–70m are data structures having a plurality of ring entries, for example, entries 71, 72, 73. Each of the TX data rings 70a–70m corresponds to one of m channels supported by the NIC 12. Each of these ring entries 71, 72, 73, accessed by software sequentially and in a circular fashion, is of a sufficient size (e.g., 64 bytes) to contain a descriptor having transmission-related information (e.g., the size of data packet, etc.) and pointers to a desired data packet located in a TX data buffer 60a–60k. The descriptors on each ring are numbered from 1 to N, where N is the number of descriptors on each ring 70a–70m. Typically, there are 1024 descriptors on a ring, i.e., N=1024 and each ring is associated with a pre-programmed bandwidth group. In addition, each descriptor ring may have one or more packets queued for transmission. Preferably, the number of TX data buffers, k, is less than or equal to (mxN), since the TX data buffers 60a–60k should be sufficient in number to hold data from N entries and m channels. When a descriptor is input into a ring entry and is queued to be subsequently read by the NIC 12, the software running in the host memory issues a "kick" command to the Core 22 in NIC 12. This command is a write operation which provides, as parameters, the TX data ring number (0-126) and the corresponding descriptor number of the last descriptor posted in the ring, as will be described in detail below.

In a preferred embodiment, each "kick" command is written to a first storage field 52 in storage location 50, providing the TX data ring number (0-126) and the corresponding descriptor number of the last descriptor posted. Since there are 127 channels in the present embodiment, 127 storage locations 50a–50m each having a first storage field 52a–52m are available for the posting of such "kick" commands. Hardware (or circuitry) on the Core 22 assigned to the processing of the packets on the NIC 12 also keeps track of the last descriptor, per ring, it is processing. This descriptor number is maintained in a second storage field 54 in storage location 50. The hardware on the Core 22 checks the contents of the first storage field 52 and the second storage field 54 when it has completed transferring a packet and is ready to transfer another packet, or when it receives a "kick" command. This is done through the use of comparing circuit 56, which compares the contents of the first storage field 52 and the contents of the second storage field 54. An example of the comparing circuit 56 is an exclusive-OR gate.

When the contents of the first storage field 52 and the contents of the second storage field 54 are equal, i.e., when both hardware and software descriptor pointers match, the corresponding ring or channel has run out of data for transmission. Under this condition, the corresponding channel goes to sleep until waken by another software "kick" command. This "kick" mechanism eliminates the need for hardware to poll the descriptor rings regardless of whether there is data to send or not. In addition, by implementing this mechanism, the hardware will no longer be required to clear the OWN bit, since the OWN bit semaphore is essentially not utilized in the present invention. As a result, transactional overhead and processing time is reduced through the application of the present invention.

The TX completion descriptor ring 80 is a data structure having a plurality of ring entries 80a–80j. The TX completion descriptor ring 80 serves as a place holder for the hardware to provide the status of a packet that was transferred to the buffer memory 42. Thus, the number of ring entries on the TX completion descriptor ring 80 is j, where $j \leq mxN$, since the ring 80 must have sufficient entries for posting N descriptors from m channels. The hardware uses a descriptor in the TX completion descriptor ring 80 to provide the corresponding TX data ring number and descriptor number corresponding to the packet that was transferred. In a preferred embodiment, the TX completion ring 80 is used to report to hardware the descriptors which are available for use by the hardware to post updates of completed transactions. Advantageously, the TX completion descriptor ring 80 is accessible by both hardware and software. In addition, the TX completion descriptor ring 80 preferably occupies 64 KBytes of host memory through 1,024 ring entries, since it has to be large enough to contain the multiple packet completion updates from m descriptor rings each having N descriptors.

Figure 4A:
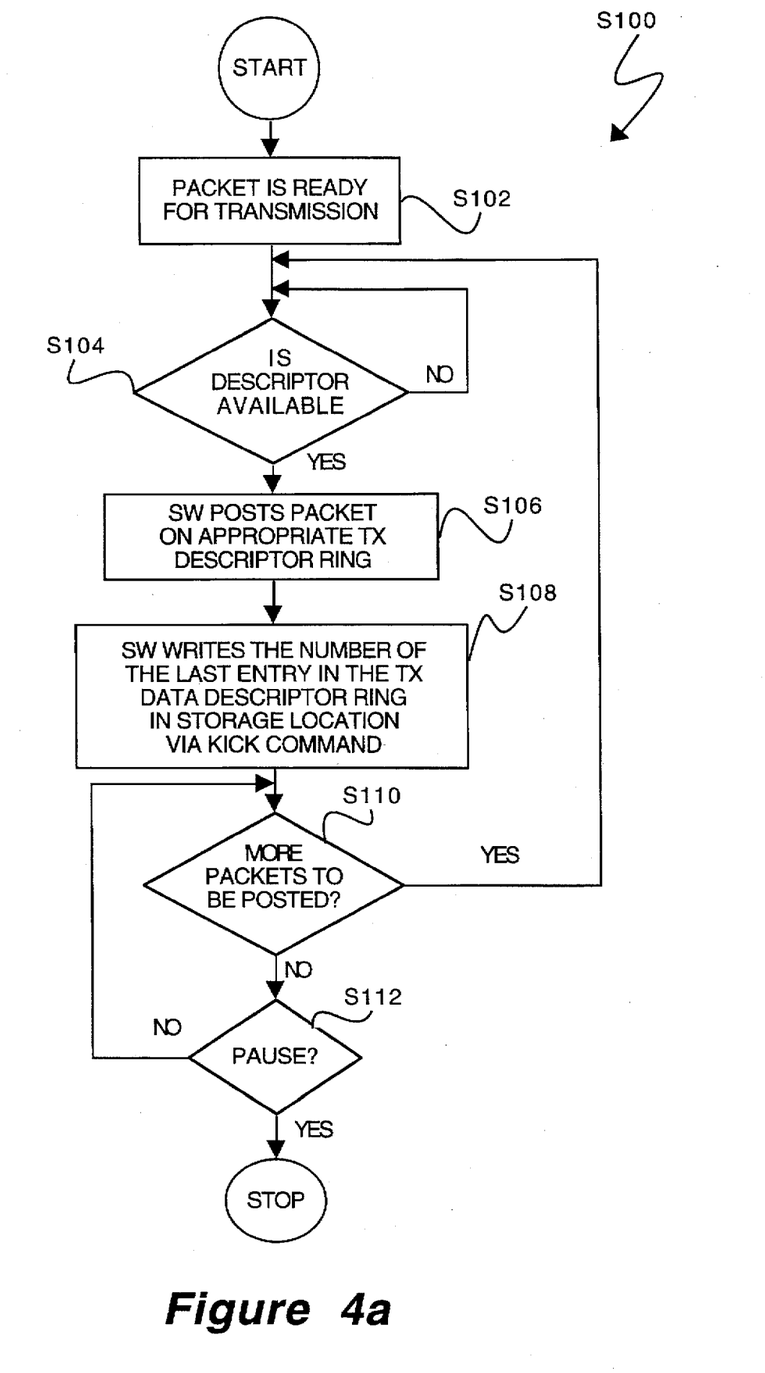
FIGS. 4a and 4b are flowcharts illustrating the process of data transfer coordination in accordance with a preferred embodiment of the present invention.

FIG. 4a is a flowchart illustrating the process S100 of data transfer coordination performed by the software running on the computer host system 48 in accordance with a preferred embodiment of the present invention. Once the Core 22 is initialized and operating, the general order of operations in transmitting a packet proceeds through the receipt of a signal indicating that a packet is ready for transmission, as shown in process block S102. The process S100 then determines if a descriptor is available for the transmission process by checking there are empty descriptors available, as shown in decision block S104. If not, the process S100 returns to process step S104 to wait until a descriptor is available. Otherwise, the process S100 proceeds to process block S106, where the software ("SW") posts descriptors for the packet on the appropriate TX data descriptor ring 70a–70m.

The process S100 then advances to process block S108, where software writes the number of the last entry in the TX data descriptor ring to the first storage field 52 in storage location 50. This process step S108 constitutes the issuance of the "kick" command. Next, the process S100 inquires if software has more packets to post for transmission, as shown in decision block S110. If so, the process S100 returns to decision block S104. If not, the process S100 queries if the process of posting packets should pause or cease, as shown in decision block S112. If so, the process S100 proceeds to pause or to terminate the process of posting packets. If not, the process S100 proceeds to decision block S110, to continue inquiring if more packets are to be posted for transmission.

Figure 4B:
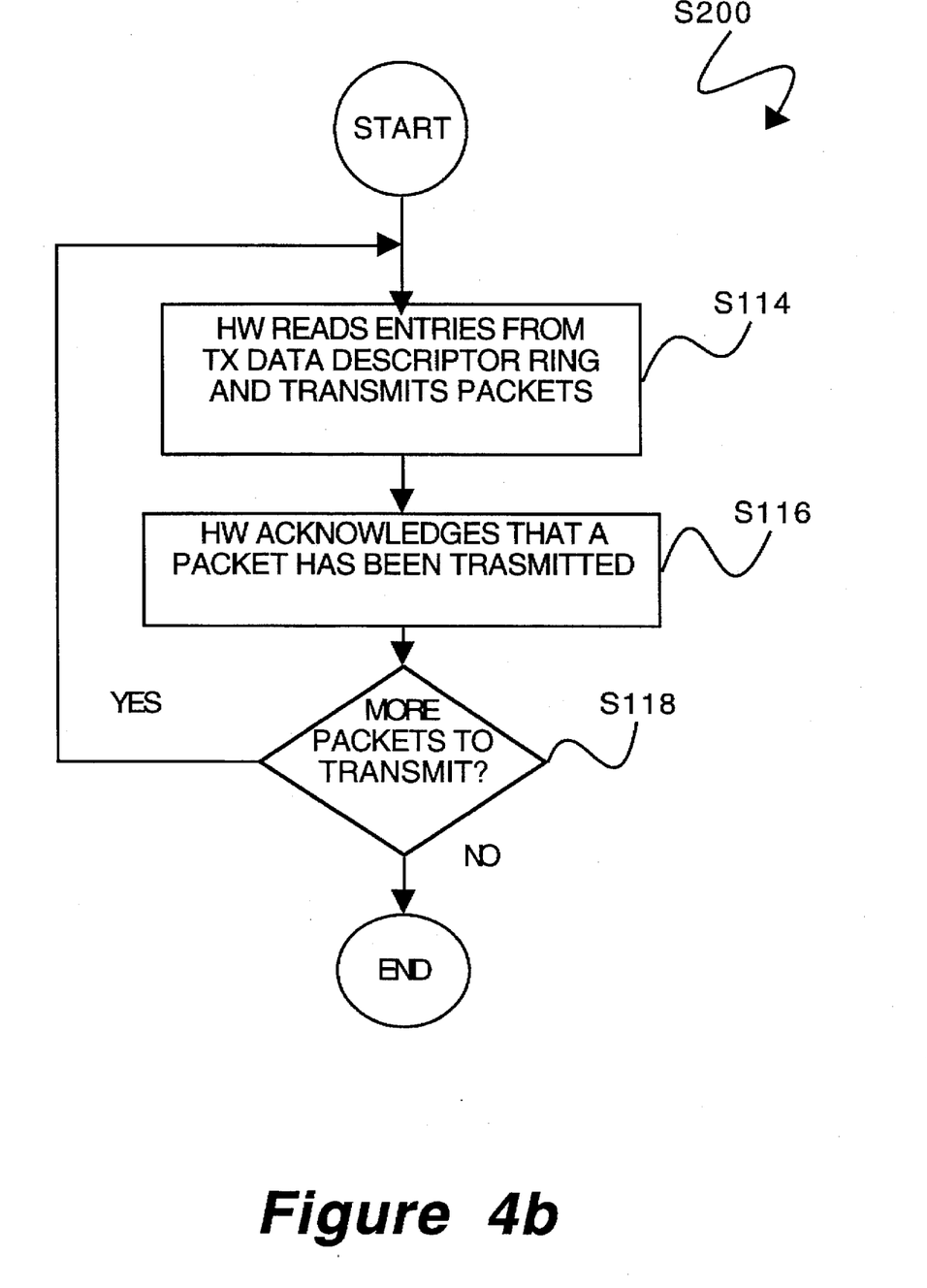

FIG. 4b is a flowchart illustrating the process S200 of data transfer coordination performed by the hardware in core 22 in accordance with a preferred embodiment of the present invention. Beginning with a start state, process S200 proceeds to process block S114, where hardware ("HW") reads the entries from the appropriate TX data descriptor ring 70a–70m and transmits the packets. Note that process S100

(which includes process steps S102–S112) operates asynchronously vis-a-vis process S200 (which include process steps S114–S118). The process S200 continues to process block S116, where hardware acknowledges that a packet has been transferred. In a preferred embodiment, the acknowledgment is issued through the use of TX completion ring 80 and by posting the corresponding TX data ring number and descriptor number of the packet that was transferred in a third storage field (not shown) in a second storage location (not shown) in accordance a preferred method of reporting the completion of a transfer and generating an interrupt which has an individual mask bit for ease of toggling in software. This technique of acknowledging the completion of a transfer is described in detail in concurrently filed and co-pending U.S. Pat. Application entitled "Method and Apparatus of Reporting Data Transfer between Hardware and Software", which is assigned to the assignee of the present invention and incorporated herein.

The process S200 then proceeds to decision block S118 to determine if more packets have to be transmitted. This is accomplished through a comparison of contents of the first storage field 52 and the contents of the second storage field 54 for a particular storage location 50a–50m. For example, a comparing circuit 56 may be used to compare the contents of the first storage field 52 and the second storage field 54 for a particular storage location 50a–50m. The comparing circuit 56 may set a flag in a status register (not shown) if the contents of the storage fields 52 and 54 are equal. If the contents of the first storage field 52 and the contents of the second storage field 54 are not equal, i.e., when both hardware and software descriptor pointers do not match, the corresponding ring or channel has more data for transmission. The process S200 thus returns to process block S114 to continue reading entries from the appropriate TX data descriptor ring 70a–70m. If the contents of the first storage field 52 and the contents of the second storage field 54 are equal, i.e., when both hardware and software descriptor pointers match, the corresponding descriptor ring or channel has ran out of data for transmission. Under this condition, the corresponding channel goes to sleep until it is waken by another software "kick" command. The process S200 terminates and is resumed upon receiving a "kick" command issued by software indicating that an entry has been posted to a TX data descriptor ring 70a–70m.

Through the application of the present invention, hardware does not have to poll the host memory to determine if software has posted packets for transmission. In addition, by implementing the "kick" mechanism, the hardware will no longer be required to clear the OWN bit, since the OWN bit semaphore is essentially not utilized in the present invention. As a result, transactional overhead and processing time is reduced through the application of the present invention.

Modifications and variations of the embodiments described above may be made by those skilled in the technology while remaining within the true scope and spirit of this invention. For instance, the present invention may be implemented in any computer system requiring the coordination of data transfer between software and hardware and is not restricted to data transfer or data transmission utilizing the ATM protocol. In addition, the storage field 52 need not be located in the same storage location 50 as the second storage field 54.

Thus, although the present invention has been described in terms of certain preferred embodiments, other embodiments that will be apparent to those of ordinary skill in the technology are also within the scope of this invention. Accordingly, the scope of the invention is intended to be defined only by the claims which follow.

We claim:

1. A computer system for transferring data, comprising:
   a host device having a host memory, the host memory having at least one data structure having a plurality of entries, each entry including an entry number and locational information of data to be transferred;
   a storage location coupled to the host device, the storage location having a first storage field and a second storage field, the first storage field for storing the entry number corresponding to locational information of data to be transferred, the second storage field for storing an entry number corresponding to locational information of transferred data; and
   a circuit coupled to the storage location for comparing the content of the first storage field to the content of the second storage field.

2. The system of claim 1, further comprising a second circuit for transferring data, the second circuit being operative if the circuit for comparing determines that the content of the first storage field is not equal to the content of the second storage field.

3. The system of claim 1, further comprising a second circuit for transferring data, the second circuit being operative when an entry number corresponding to an entry which includes locational information of data to be transferred is stored in the first storage field.

4. The system of claim 1, wherein the data structure is a descriptor ring comprising the plurality of entries, the entries being arranged in circular fashion.

5. The system of claim 1, wherein the circuit for comparing is an exclusive-OR gate.

6. The system of claim 1, further comprising a second data structure and a second storage location, the second storage location having a third storage field and a fourth storage field, wherein the data structure is a first data structure which corresponds to a first channel for transferring data and the second data structure corresponds to a second channel for transferring data.

7. The system of claim 1, wherein the system is a network system.

8. The system of claim 6, wherein data is transferred from the host device to the network.

9. The system of claim 6, wherein the network is an asynchronous transfer mode network.

10. A circuit for transferring data, the circuit being responsive to a host device having a host memory, the host memory having at least one data structure having a plurality of entries, each entry including an entry number and locational information of data to be transferred, the circuit comprising:
    a storage location coupled to the host device, the storage location having a first storage field and a second storage field, the first storage field for storing the entry number corresponding to locational information of data to be transferred, the second storage field for storing an entry number corresponding to locational information of transferred data; and
    a circuit for comparing the content of the first storage field to the content of the second storage field.

11. The circuit of claim 10, further comprising a second circuit for transferring data responsive to the circuit for comparing, the second circuit being operative if the circuit for comparing determines that the content of the first storage field is not equal to the content of the second storage field.

12. The circuit of claim 10, further comprising a second circuit for transferring data, the second circuit being operative when an entry number corresponding to an entry which includes locational information of data to be transferred is stored in the first storage field.

13. The system of claim 10, wherein the data structure is a descriptor ring comprising the plurality of entries, the entries being arranged in circular fashion.

14. The circuit of claim 10, wherein the circuit for comparing is an exclusive-OR gate.

15. The circuit of claim 10, further comprising a second data structure and a second storage location, the second storage location having a third storage field and a fourth storage field, wherein the data structure is a first data structure which corresponds to a first channel for transferring data and the second data structure corresponds to a second channel for transferring data.

16. A method for coordinating data transfer in a computer, comprising the steps of:

storing an entry number corresponding to locational information of data to be transferred in a first storage field;

transferring data corresponding to the entry number stored in the first storage field;

storing the entry number corresponding to locational information of transferred data in a second storage field;

comparing the content of the first storage field to the content of the second storage field; and transferring data corresponding to the entry number stored in the first storage field if the content of the first storage field is not equal to the content of the second storage field and terminating the transfer of data if the content of the first storage field is equal to the content of the second storage field.

17. The method of claim 16, further comprising the step of transferring data corresponding to the entry number stored in the first storage field if the entry number stored in the first storage field includes locational information of data to be transferred.

18. The method of claim 16, further comprising the step of providing a host device having a host memory, the host memory having at least one data structure having a plurality of entries, each entry including an entry number and locational information of data to be transferred, prior to the first storing step.

19. The method of claim 18, wherein in the step of providing a host device, the data structure is a descriptor ring comprising a plurality of entries, the entries being arranged in circular fashion.

20. The method of claim 16, further comprising the steps of providing a second data structure and a second storage location, the second storage location having a third storage field and a fourth storage field, wherein the data structure is a first data structure which corresponds to a first channel for transferring data and the second data structure corresponds to a second channel for transferring data.

* * * * *

UNITED STATES PATENT AND TRADEMARK OFFICE
CERTIFICATE OF CORRECTION

PATENT NO.  : 5,675,829
DATED       : October 7, 1997
INVENTOR(S) : Oskouy et al.

It is certified that error appears in the above-identified patent and that said Letters Patent is hereby corrected as shown below:

Title page,
Item [56], References Cited, please delete inventor name "Gaskins E1 AI" and insert -- Gaskins et al. --.

Column 2,
Lines 62-64, please delete "used for data of the present invention. transmission in a system utilizing the apparatus and method" and insert -- used for data transmission in a system utilizing the apparatus and method of the present invention. --

Signed and Sealed this

Third Day of September, 2002

Attest:

Attesting Officer

JAMES E. ROGAN
Director of the United States Patent and Trademark Office